United States Patent
MacLaurin (10) Patent No.: US 7,554,544 B2
(45) Date of Patent: Jun. 30, 2009

(54) JUST-IN-TIME USER INTERFACE LAYOUT

(75) Inventor: Matthew B. MacLaurin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 784 days.

(21) Appl. No.: 10/801,794

(22) Filed: Mar. 16, 2004

(65) Prior Publication Data
US 2005/0206630 A1 Sep. 22, 2005

(51) Int. Cl.
G09G 5/00 (2006.01)

(52) U.S. Cl. .................. 345/440; 345/619; 345/629

(58) Field of Classification Search .............. 345/440, 345/471, 619, 629; 715/700, 764, 788–790, 715/794
See application file for complete search history.

(56) References Cited

U.S. PATENT DOCUMENTS

| | | | |
|---|---|---|---|
| 5,384,910 A | 1/1995 | Torres | |
| 6,043,817 A | 3/2000 | Bolnick et al. | |
| 6,073,148 A * | 6/2000 | Rowe et al. | 345/471 |
| 6,271,858 B1 | 8/2001 | Dalal et al. | |
| 6,526,440 B1 | 2/2003 | Bharat | |
| 6,529,903 B2 | 3/2003 | Smith et al. | |
| 6,615,209 B1 | 9/2003 | Gomes et al. | |
| 6,631,498 B1 | 10/2003 | McCauley et al. | |
| 6,658,423 B1 | 12/2003 | Pugh et al. | |
| 6,678,681 B1 | 1/2004 | Brin | |
| 6,693,964 B1 * | 2/2004 | Zhang et al. | 375/240.16 |
| 6,993,074 B2 * | 1/2006 | Zhang et al. | 375/240.12 |
| 2001/0050955 A1 * | 12/2001 | Zhang et al. | 375/240.12 |
| 2002/0123988 A1 | 9/2002 | Dean et al. | |
| 2002/0133481 A1 | 9/2002 | Smith et al. | |
| 2005/0273730 A1 * | 12/2005 | Card et al. | 345/440 |

OTHER PUBLICATIONS

Stephen Kurlow. A New Object-oriented Technique for Building a Dynamic Graphical User Interface. Proceedings of the 1995 Conference of the Centre for Advanced Studies on Collaborative Research, 1995. 11 pages.

Sergey Brin, et al., The Anatomy of a Large-Scale Hypertextual Web Search Engine. Proceedings of the Seventh International Conference on World Wide Web, 1998. 18 pages.

* cited by examiner

Primary Examiner—Chante Harrison
(74) Attorney, Agent, or Firm—Lee & Hayes, PLLC (57) ABSTRACT

The present invention relates to a system and method to facilitate rendering of a collection of display items in a computationally efficient manner. In one aspect, a system for rendering a display is provided. The system includes a drawing component that determines visible items to display and a logic component that selectively defers layout of the visible items in a just-in-time manner. The logic component determines complexity of the visible items in order to defer the layout. This can include associating a flag with the visible items, wherein if the flag can be set true for complex items and the flag set false for non-complex items. The complexity can be determined by a threshold number of subcomponents or children objects that are associated with the visible items.

21 Claims, 8 Drawing Sheets

JUST-IN-TIME USER INTERFACE LAYOUT

TECHNICAL FIELD

The present invention relates generally to computer systems and more particularly, the present invention relates to systems and methods that selectively and automatically defer graphics rendering of user interface display items in a just-in-time manner.

BACKGROUND OF THE INVENTION

Various graphical user interfaces have been developed to provide an interactive framework for computer users. Computer programs typically provide a graphical user interface (GUI) to facilitate data entry, to enable viewing output on a display screen, as well as to manipulate or rearrange data. A graphical user interface can be associated with an application program or operating system shell, which may be running on a user's local machine and/or remotely, such as in a distributing computing system or over the Internet. In view of continuing technological developments and increasing use of the Internet, people are using computers to access information to an ever-increasing extent. Such information can reside locally on the person's computer or within a local network or be global in scope, such as over the Internet.

Users of window-based graphical user interfaces face many problems when they employ various programs for multiple tasks or activities—they often have a large number of windows to manage, with many windows for each task. Switching between tasks is difficult because the windows often can be scattered across the desktop display. Moreover, if windows are minimized while not in use, they are typically not organized together. If not minimized, a user can be faced with a difficult task of locating all relevant obscured windows and bringing them to a top of a display. Furthermore, content within a window such as application icons, document sheets, presentation slides and so forth continue to clutter the user's workspace which tends to decrease productivity.

When users begin employing large display configurations (e.g., multiple monitors), managing windows and tasks becomes an ever more difficult problem. Managing many display objects on small displays (e.g., PDA's) is also difficult—in such case, oftentimes sufficient screen space is not available to display objects of interest. These type displays and options for driving such displays are also consuming more processor resources—especially when rendering more complex patterns or objects to the display.

In general, contemporary user interface systems can be described in terms of a layout phase and a drawing phase. In the layout phase, the dimensions of each element and sub-element of the user interface are calculated and the elements are then arranged graphically. In the drawing phase, the elements are converted into a visual representation and displayed on the screen. In modern graphical user interface systems—such as those used in the Windows Explorer, the Macintosh Finder, and particularly in web browsers such as Internet Explorer, a large portion of the computational resources user by the interface system are dedicated to layout. In extremely large collections of user interface elements, the cost of layout becomes increasingly high and results in reduced responsiveness of the user interface. Furthermore, with the advent of extremely large storage devices and network-based storages, the need for working effectively with very large collections of items—such as those returned by a web search—is becoming increasingly important. The ability of future interfaces to cope with very long lists in an efficient manner will be an important determinant of success and perceived suitability for future user scenarios.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate automated rendering of information at a graphical user interface in a computationally efficient manner. The subject invention enables a user interface system to present large collections of display elements or items at the interface while incurring lower computational costs than conventional systems and methods. In most graphical user interfaces for file systems, a large portion of the computational resources utilized by the interface system are dedicated to the layout of the objects. In extremely large collections of objects, the cost of layout becomes increasingly high. The present invention provides an improved system and method for efficiently calculating the layout of objects by deferring the cost of layout for selected items until they are actually displayed.

An approximate representation of the size of each individual user interface element can be calculated before actual display that accounts for most of the layout overhead for objects having simpler layout requirements. Thus, in one aspect, the value of the subject invention is based on the insight that, in user interface displays consisting of large collections of items, many of the items will likely not be brought into the view of the user (i.e., they may change to another display before the final rendering). As such, the system seeks to defer the cost for layout for such items until they are actually displayed. In this manner, processing operations for rendering complex displays can be minimized.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and method to facilitate rendering of a collection of display items in a computationally efficient manner. In one aspect, a system for rendering a display is provided. The system includes a drawing component that determines visible items to display and a logic component that selectively defers layout of the visible items in a just-in-time manner. The logic component determines complexity of the visible items in order to defer the layout. This can include associating a flag with the visible items, wherein if the flag can be set true for complex items and the flag set false for non-complex items. The complexity can be determined by a threshold number of subcomponents or children objects that are associated with the visible items (e.g., objects having no children components considered simple). A rough layout component can be provided to determine an approximation for the visible items which further reduces computational resources.

As used in this application, the terms "component," "driver," "item," "object," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
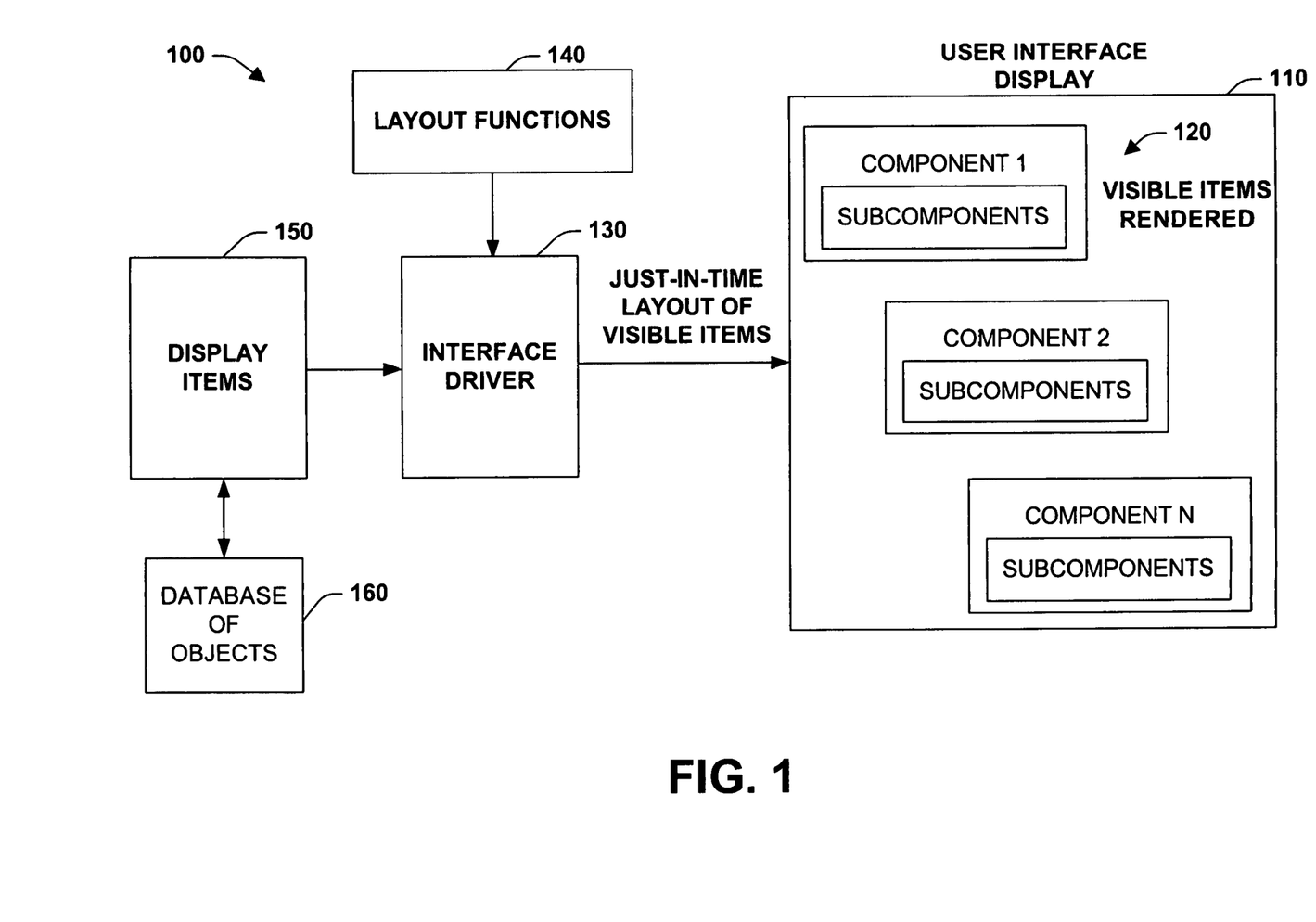
FIG. 1 is a schematic block diagram illustrating a just-in-time layout system in accordance with an aspect of the present invention.

Referring initially to FIG. 1, a just-in-time layout system 100 is illustrated in accordance with an aspect of the present invention. The system 100 includes a user interface display 110 having one or more visible items or components 120 that are rendered to the display. Respective components 120 can be associated with various subcomponents or children (e.g., an interface input button having more detailed component renderings inside the button). An interface driver 130 renders visible items or components 120 to the display 110 in a just-in-time manner. This is achieved in part by various layout functions 140 which are described in more detail below. The layout functions 140 determine which display items 150 are to be rendered at the display 110 or selectively withheld from actual display depending on the complexity of the item (e.g., high computations required to render item may defer layout of item to later time), wherein respective items or data associated therewith can be stored in a database 160.

Complexity can be determined from a plurality of factors subjective or objective in nature. For instance, components 120 having lower than a predetermined threshold number of subcomponents or children can be considered low complexity, whereas numbers above this value can be considered higher complexity. The complexity factor can be a based on a given distinction between items such as which items or components 120 have no children versus those which do. It can also be based on a subjective continuum based on how smart or detailed a given object needs to be when drawing or laying out associated subcomponents or children objects. In general, the system 100 can be provided as part of a user interface programming system or substantially any type of graphics rendering system. The value of the system is based in part on the insight that, in user interface displays (or other type displays) consisting of large collections of items, many of the items may not need to actually be brought into view of the user. Accordingly, the system 100 seeks to defer the cost of layout for such items via the layout functions 140 until they are actually required for display at the interface 110.

It is noted that the interface driver 130 and layout functions 140 can process, display or include items 150 having various dimensions, shapes, user controls, sizing, groupings, content renderings, and other aspects for interacting with the items (e.g., metadata and control parameters) including subcomponents of processed items for controlling the display of information to the user. An item 150 at focus in the display 110 can be rendered in a rich geometrical layout, employing renderings and animations employing two- or three-dimensional graphics. The visualizations can be a function of one or more of properties associated with the type of item, item structure, item content, and metadata about the history of interaction with the item. Users can browse components of the items, at times, selectively zooming with a mouse and keyboard (or other input device) on subcomponents, in a graphical and/or semantic manner.

It is also noted, that the interface 110 can include display items 150 having one or more items or item subcomponents which are graphically displayed along an axis (or multiple axis) of rendering or throughout the display. Respective items or subcomponents may have various portions for providing more detailed information such as graphics, text, embedded audio and/or image files, and so forth. It is to be appreciated that although rectangular components 120 are illustrated, information can be rendered in substantially any size shape, color, dimension, and so forth.

The user interface 110 can be provided as part of the graphical user interface and as part of and/or in association with a computerized display. The display can be configured via interfaces regarding various aspects of display or content preferences, configurations and/or desired information formatting by the user. The display can include display objects (e.g., icons, buttons, sliders, input boxes, selection options, menus, tabs, and so forth) having multiple dimensions, shapes, colors, text, data and sounds to facilitate optimal control, sizing/resizing, format and/or display of the components 120. In addition, various menus and alternative screens or display outputs can be provided that perform a plurality of aspects of the present invention. These aspects can also include a plurality of inputs for adjusting and configuring one or more aspects of the present invention. This can include receiving user commands from a mouse, keyboard, speech input and/or other device to effect operations of the display.

Figure 2:
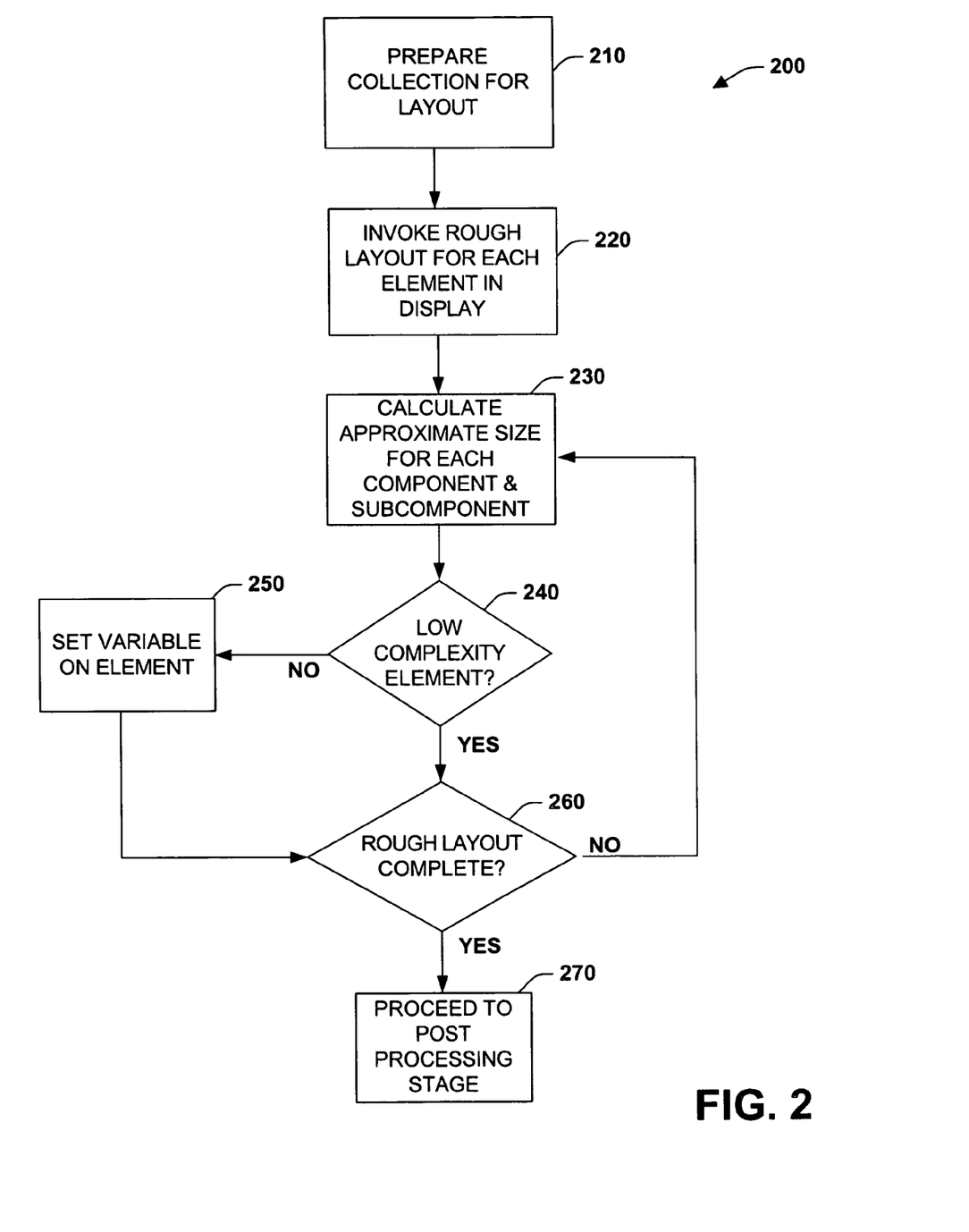
FIG. 2 is a flow diagram illustrating a pre-process layout phase in accordance with an aspect of the present invention.
Figure 3:
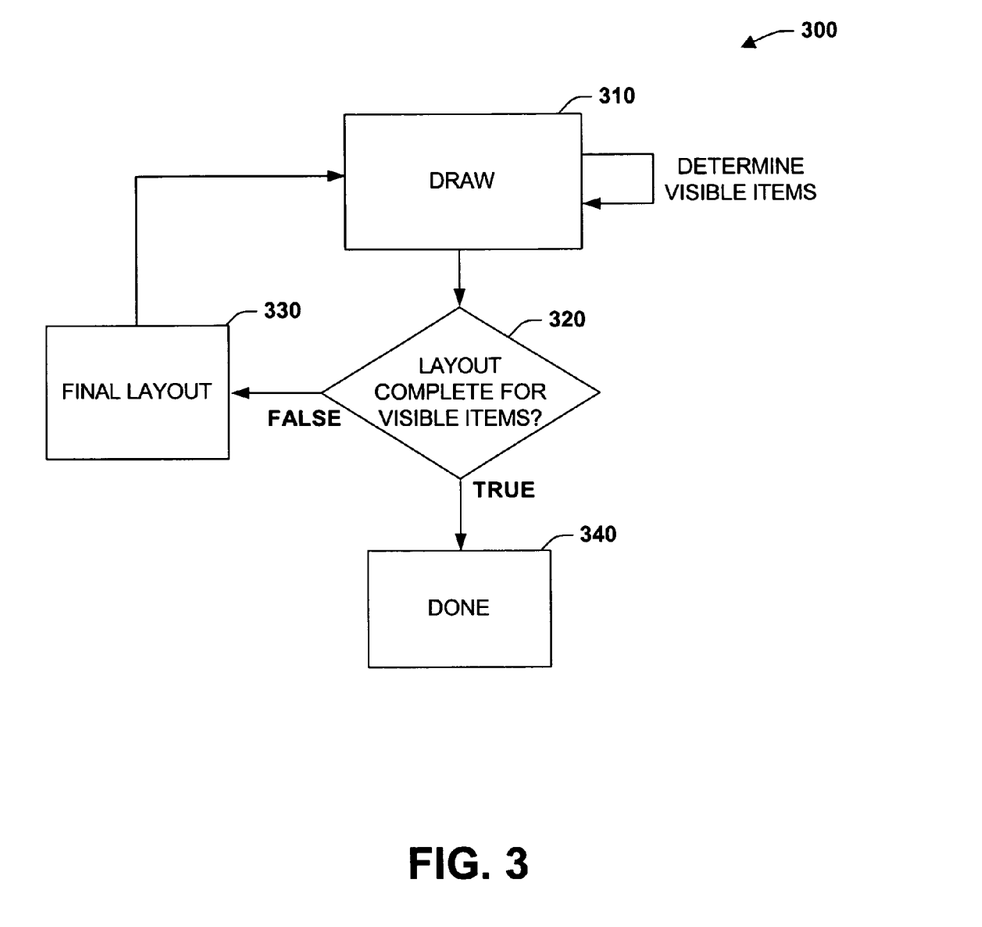
FIG. 3 is a flow diagram illustrating a post process layout phase in accordance with an aspect of the present invention.
Figure 5:
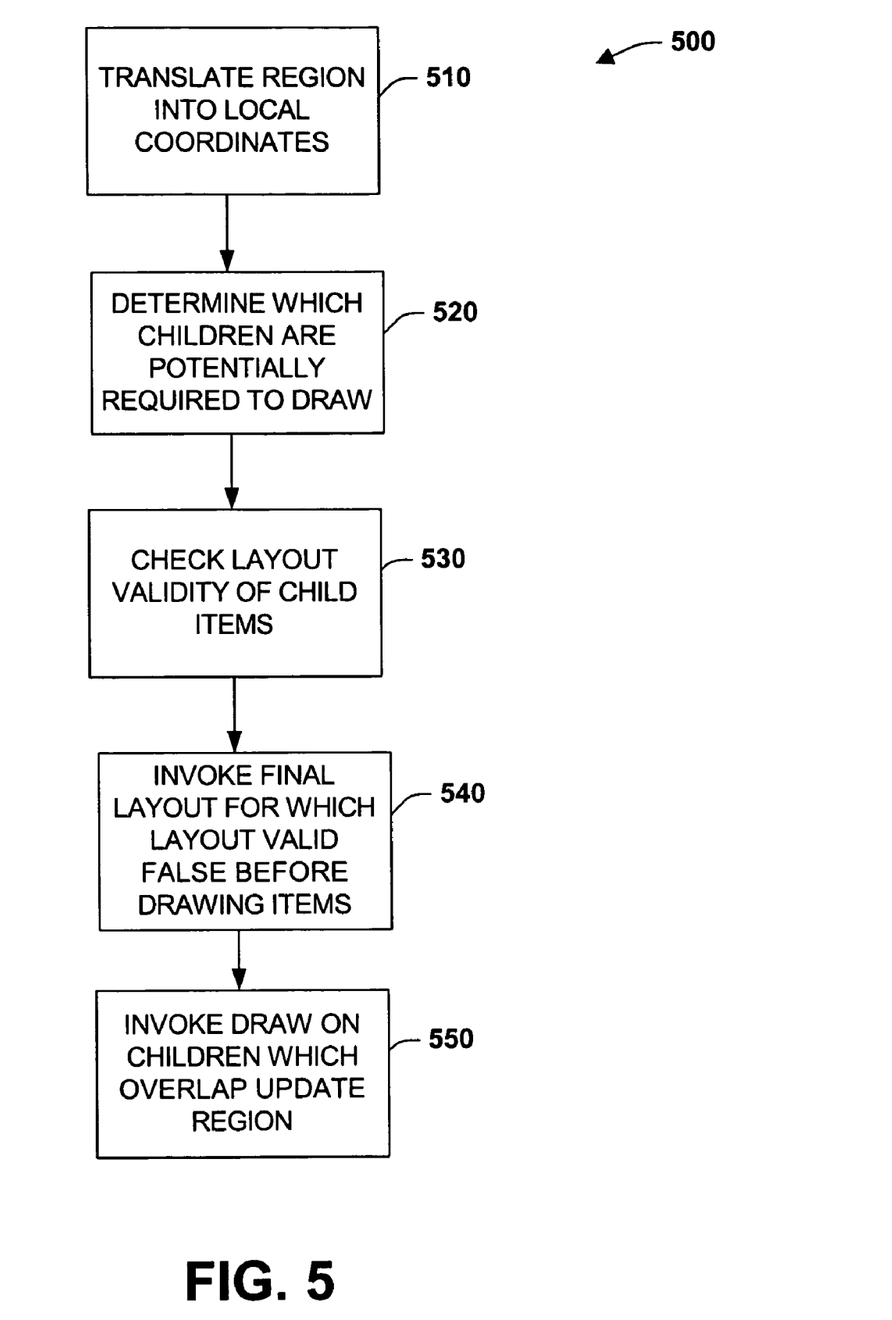
FIG. 5 is a flow diagram illustrating a child element rendering process in accordance with an aspect of the present invention.

FIGS. 2, 3, and 5 are methodologies illustrating just-in-time layout processes in accordance with an aspect of the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 2 illustrates a pre-process layout phase 200 in accordance with an aspect of the present invention. Generally, for each rendering class in a user interface system, four functions are defined: Rough Layout, Final Layout, Layout Complete, and Draw which are described in more detail below with respect to FIG. 4. Proceeding to 210, a collection of user interface elements are prepared for display (e.g., read database, perform initial rendering computations), wherein a Rough Layout function is invoked is for each component and subcomponent at 220. In this phase, an approximate representation of the size of individual user interface elements is calculated at 230. Generally, interface elements can employ conservative approximations as precision is typically unimportant. This computation 230 can result in reductions of 90% or more in initial layout costs.

At 240, a determination is made as to whether a low complexity element is involved. Thus, some user elements with very simple layout requirements will require no further layout. For more complex elements with higher layout costs, a variable is set on the element indicating that its layout is not yet complete at 250. This variable is exposed to other objects through the Layout Complete function, which returns true if no further layout is required. At 260, a determination is made as to whether or not rough layout is complete. If not, the process proceeds back to 230 for further layout computations. If so, the process proceeds to a post processing stage at 270 which is described in more detail with respect to FIG. 3.

Turning to FIG. 3, a post-process layout phase 300 is illustrated in accordance with an aspect of the present invention. After the Rough Layout phase described above with respect to FIG. 2, drawing commences by invoking a Draw function or method recursively on all components and subcomponents of the user interface collection at 310. The Draw function uses properties of the particular element being drawn to determine which subcomponents will be visible. For example, a user interface element which draws its subcomponents in a grid pattern will be able to determine that some subcomponents will not be visible based on the current size of the window. For visible subcomponents, a Layout Complete function is tested at 320. If it returns false, then a Final Layout function is invoked for the subcomponent at 330. Draw is then invoked recursively on the subcomponent at 310. When layout is complete at 320, the process ends at 340 with rendered items visible at the display. In many situations, the user may change the display before seeing all the hidden items, and thus, Final Layout will not be invoked. In cases where the hidden items are brought into view, the incremental cost of invoking Final Layout for items as they appear is generally below the user's threshold of perception.

Figure 4:
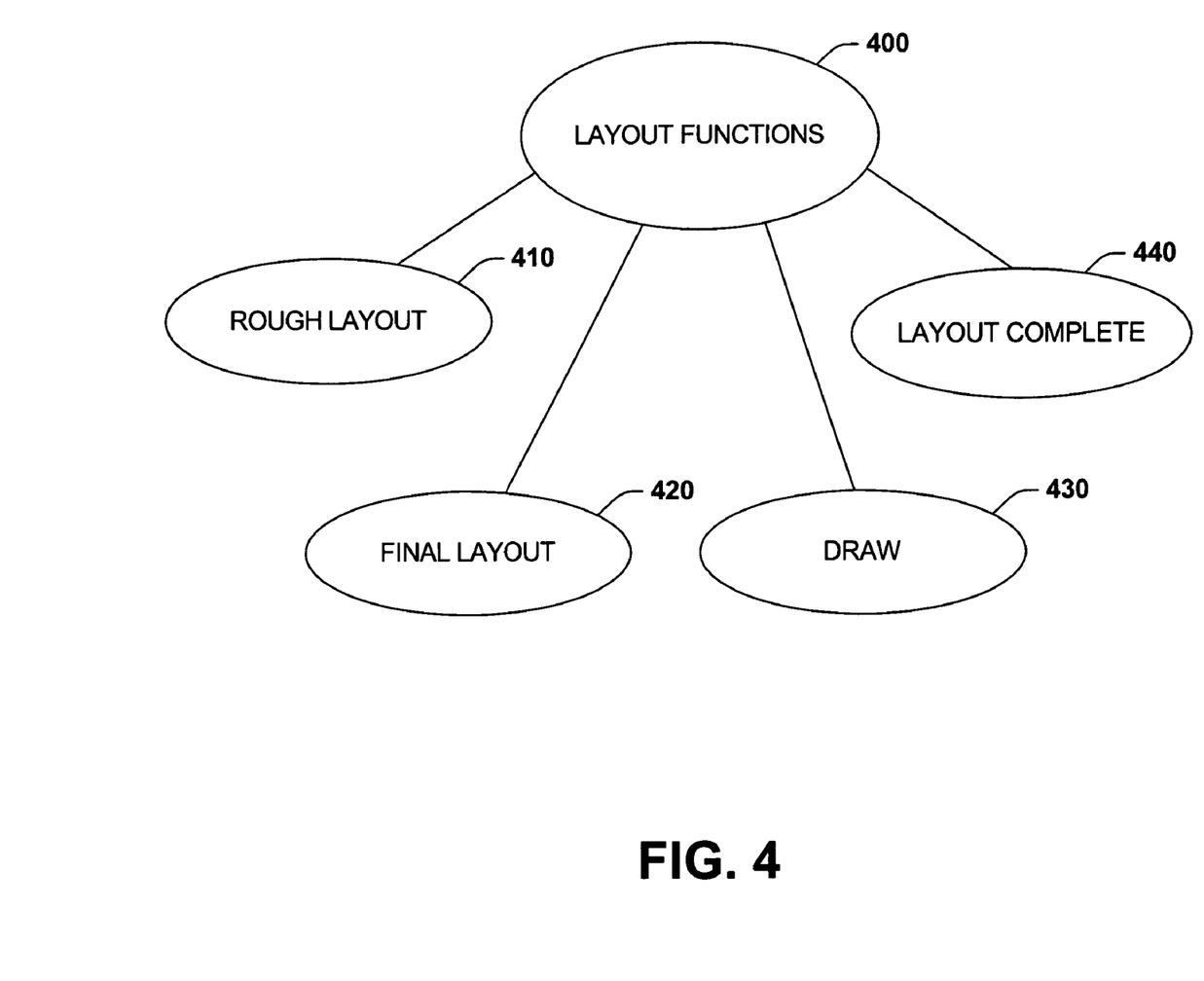
FIG. 4 is a diagram illustrating layout functions in accordance with an aspect of the present invention.

FIG. 4 illustrates various layout functions 400 in accordance with an aspect of the present invention. It is noted that such functions can be implemented in substantially any programming language such as C# or C++, for example. At 410, Rough Layout is a conceptual pass that is performed when a user interface object is constructed and added to its container (e.g., a button added to a window). Rough Layout is generally not a function call; it's a responsibility of the implementor of the class. One requirement of the rough layout phase is that the bounds of the object are to be determined. For a button, this would be its outline. Generally, internal contents of the item do not need to be laid out, since the system does not yet know that the objects is or will become visible. Thus, after rough layout, a Bounds property of the object (e.g., a RectangleF, in GDI+ terms) is finalized which is a general requirement. For some objects, that is all the processing necessary, whereas others have more complex internal structure that should defer layout until it is actually determined to be necessary. After rough layout, if the object requires more layout, then it sets its "LayoutValid" property to false. This informs the system that layout should be finished before the object can be displayed.

At 420, Final Layout is a virtual function with an example signature FinalLayout(RectangleF region). The context is that the item is definitely visible and it should finalize its internal structure in preparation for a Draw( ) call. After final layout, a call to Draw( ) should succeed. After final layout is complete, children of the current node should have passed Rough Layout (since they have been constructed and installed,) but they may or may not have been finally laid out. The region submitted to Final Layout may be used to selectively finalize layout on children, but this is generally an optional enhancement at the implementor's discretion. After Final Layout of an object, the LayoutValid property will be true.

At 430, Draw is a virtual function with the following exemplary signature: Void Draw(Graphics g, RectangleF updateRegion). One requirement for the implementor is to generate the correct pixels within a supplied graphics object using GDI+ calls. The supplied region indicates the area that should be filled in. If, for example, a window is partially revealed, the region would be smaller than the total area of the window, and this can be used for optimization. There is no penalty for ignoring this region, though. The region is supplied in the same coordinate system as the bounds of the object, wherein the region is guaranteed to overlap the bounds of the object. At 440, a Layout Complete function is a logic function that determines whether further renderings for an item are required (e.g., flag indicating higher complexity item), or whether no further layout should be applied to the item.

FIG. 5 illustrates a child element rendering process 500 in accordance with an aspect of the present invention. In this aspect, if a display object described above with respect to FIG. 4, has child elements, then the draw method generally performs other operations such as:
1) translate the region into "local coordinates" at 510;
2) determine which children are potentially required to draw at 520;
3) check the layout validity of the child items at 530;
4) before drawing the items, invoke Final Layout on any item for which LayoutValid=>false at 540; and
5) invoke draw( . . . ) on children which overlap the update region at 550.

Figure 6:
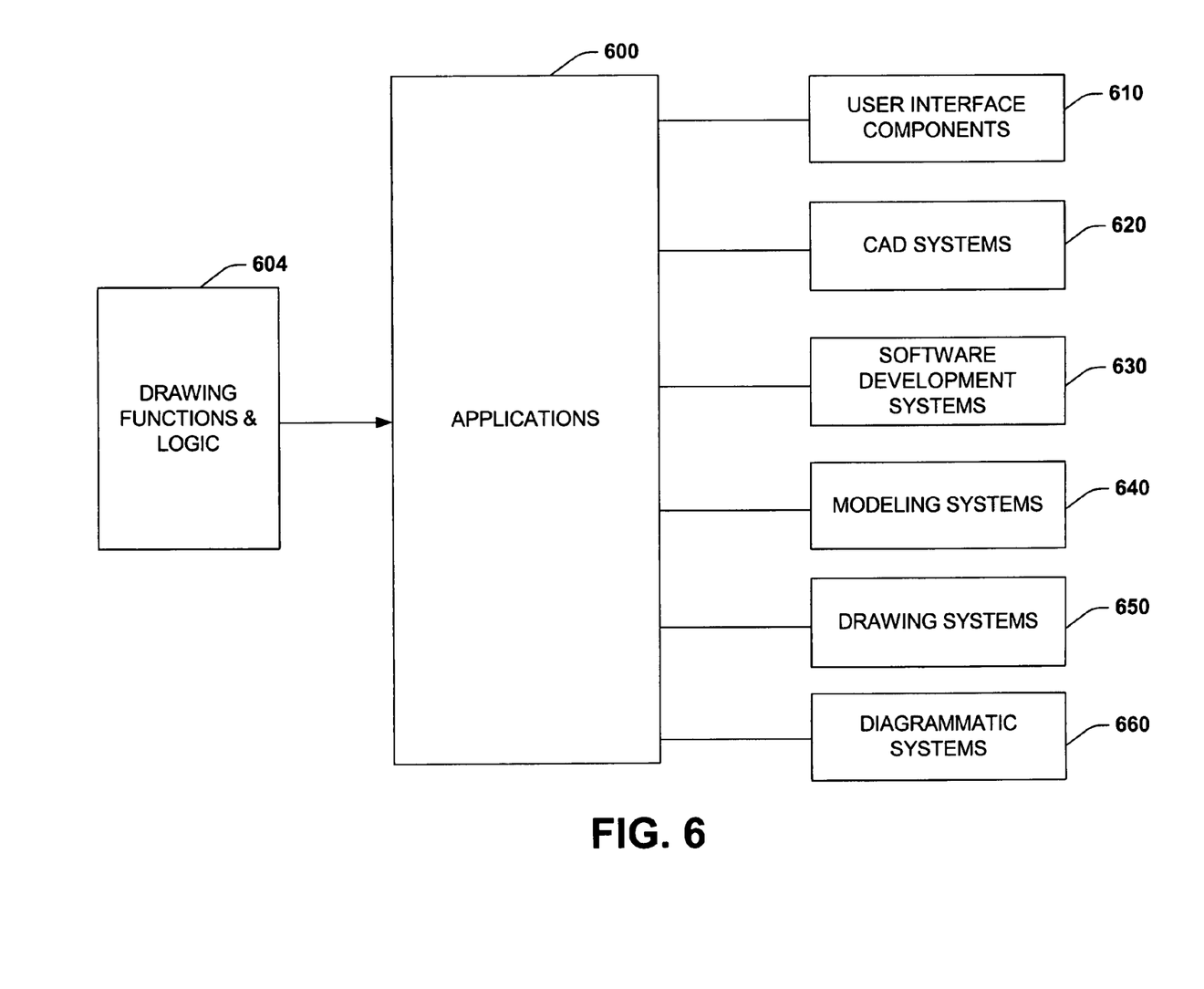
FIG. 6 illustrates exemplary drawing applications in accordance with an aspect of the present invention.

FIG. 6 illustrates exemplary rendering applications 600 in accordance with an aspect of the present invention. The applications 600 can be driven from or associated with one or more drawing and logic functions 604 and previously described. It is to be appreciated that the applications 600 represented in FIG. 6 are exemplary in nature and are provided for illustrative purposes, whereby the present invention can be employed with substantially any type of drawing or rendering package. Also, it is to be appreciated that the present invention can employ substantially any coordinate system, including multidimensional coordinate systems, and employ substantially any display format, wherein the display format can include substantially any shape, color, sound, dimension (e.g., displaying list of items in 3 dimensions where different sounds are played as different items are scrolled), code format—including embedded executables, and include combinations of these and other respective formats or attributes. In addition, information retrieved from a database can be directed to substantially any portion of a display (not shown), wherein respective display operations can occur. It is noted that display content can be transformed as it is rendered to the user. For example, the content or processed items of a collection can be scaled in a smaller or larger manner such as generating an iconic representation of the content or an expanded view of the content.

At 610, one application that can be employed is with respect to conventional user interfaces such as through a window providing various display items selectable by the user. In some cases, various window interfaces can be presented, wherein the selective and deferred display aspects of the present invention can be applied to one or more of the interfaces, if desired. At 620, Computer Aided Design packages (e.g., Visio) can be enhanced by the present invention. Selective display and deferral can occur in various circumstances such as during sizing and resizing operations whereby items can come in and out of view. At 630, software development systems (e.g., Visual Studio) that visually present objects or items to the user can employ the deferral and display methods of the present invention. Other applications include modeling applications with visual renderings at 640 (e.g., Mathlab), drawing systems at 650 such that are employed by digital artists to render objects, and/or diagrammatic systems 660 such as flow chart or business packages that render items for display.

Figure 7:
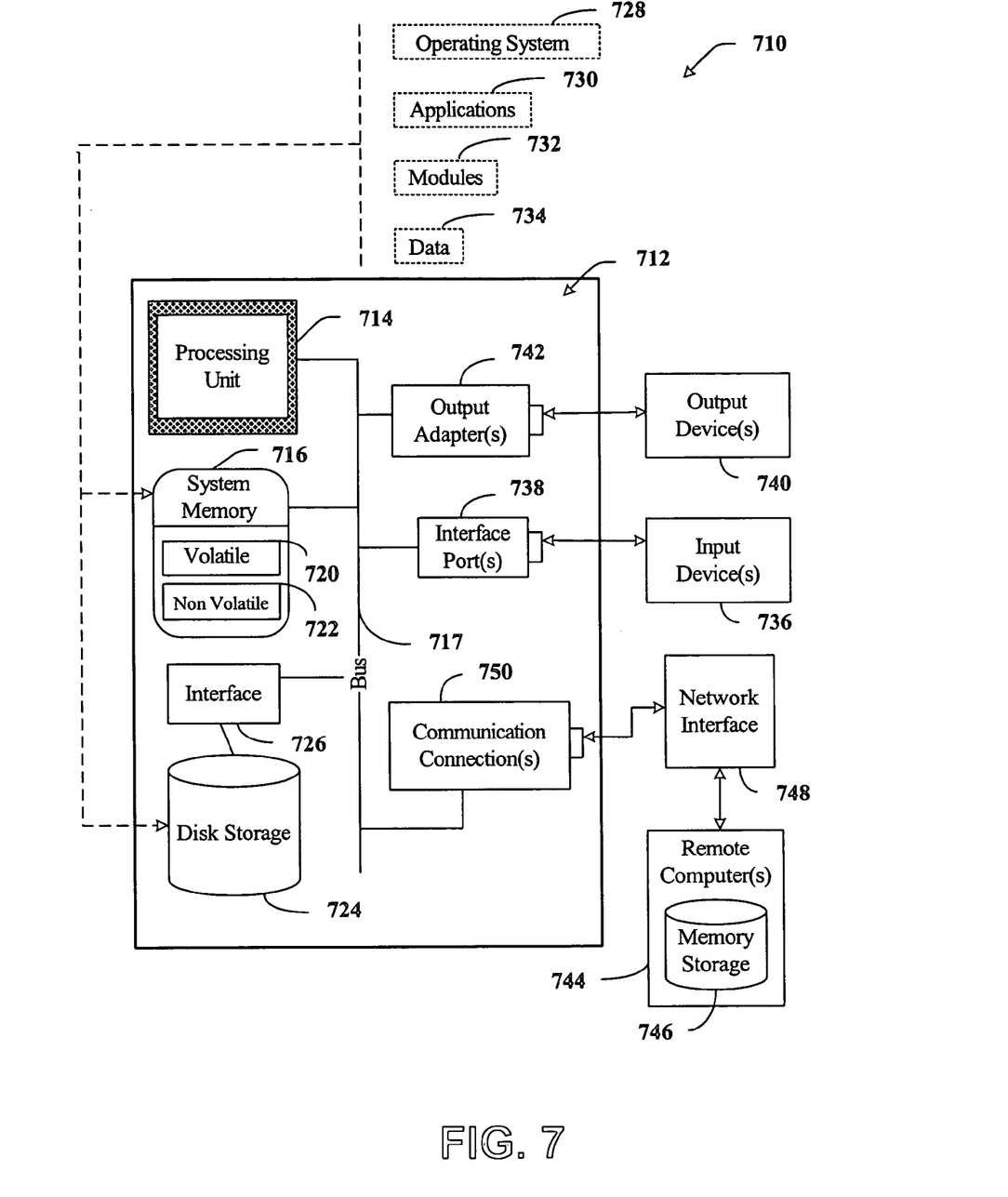
FIG. 7 is a schematic block diagram illustrating a suitable operating environment in accordance with an aspect of the present invention.

With reference to FIG. 7, an exemplary environment 710 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/non-removable, volatile/non-volatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

Figure 8:
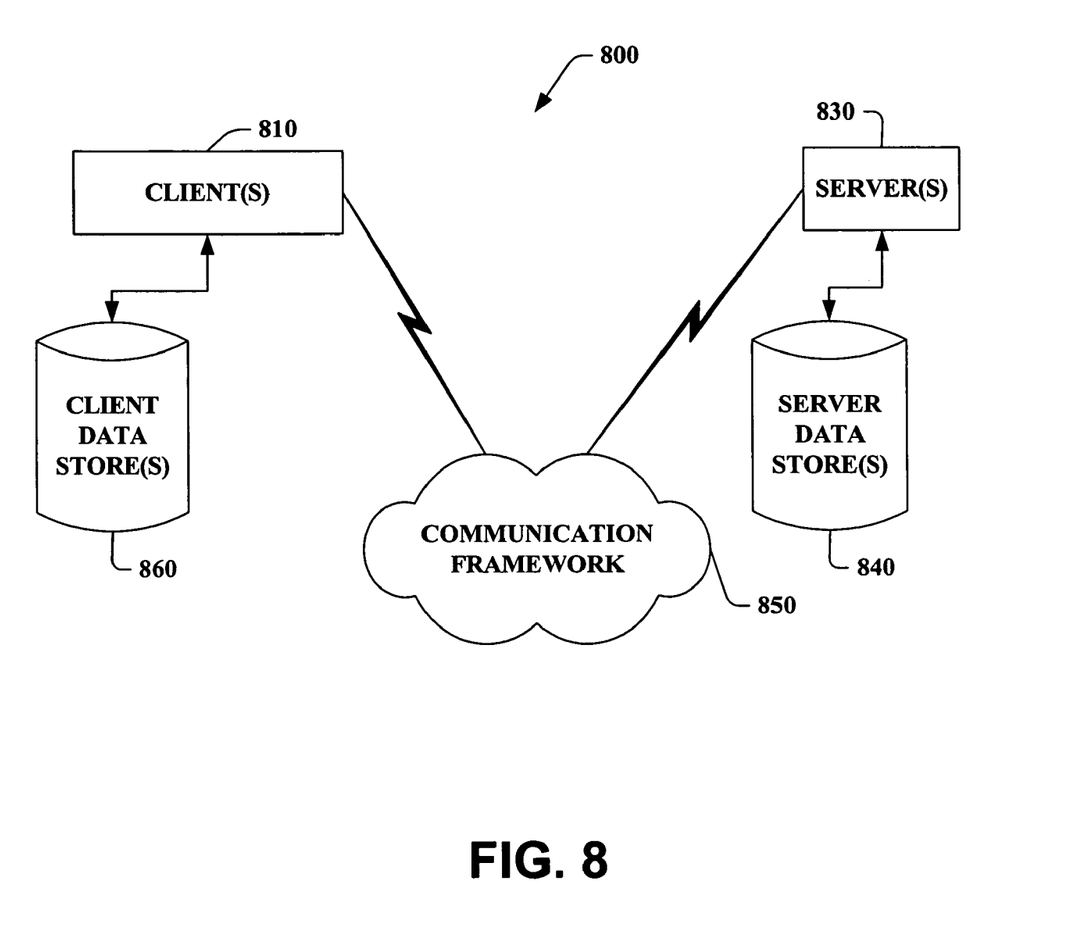
FIG. 8 is a schematic block diagram of a sample-computing environment with which the present invention can interact.

FIG. 8 is a schematic block diagram of a sample-computing environment 800 with which the present invention can interact. The system 800 includes one or more client(s) 810. The client(s) 810 can be hardware and/or software (e.g., threads, processes, computing devices). The system 800 also includes one or more server(s) 830. The server(s) 830 can also be hardware and/or software (e.g., threads, processes, computing devices). The servers 830 can house threads to perform transformations by employing the present invention, for example. One possible communication between a client 810 and a server 830 may be in the form of a data packet adapted to be transmitted between two or more computer processes. The system 800 includes a communication framework 850 that can be employed to facilitate communications between the client(s) 810 and the server(s) 830. The client(s) 810 are operably connected to one or more client data store(s) 860 that can be employed to store information local to the client(s) 810. Similarly, the server(s) 830 are operably connected to one or more server data store(s) 840 that can be employed to store information local to the servers 830.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for rendering a display, comprising:
   at least one memory; and
   at least one processor coupled to the at least one memory, the at least one processor configured to act as:
   a drawing component that determines visible items to a display;
   a logic component that selectively defers layout of the visible items to the display in a just-in-time manner, the logic component determines complexity of the visible items in order to defer the layout, and the logic component associates a flag with the visible items, the flag being true for complex items and the flag being false for non-complex items; and
   a rough layout component that determines an approximation for the visible items and identifies at least one object for which a final layout is to be completed before display thereof.

2. The system of claim 1, the complexity determined by a threshold number of subcomponents or children objects that are associated with the visible items.

3. The system of claim 1, further comprising a final layout component that renders the visible items to the display.

4. The system of claim 3, the final layout component is a virtual function with a signature FinalLayout (ShapeF region).

5. The system of claim 4, the final layout component determines that an item is visible and finalizes an internal structure in preparation for a draw function.

6. The system of claim 5, further comprising a region submitted to the final layout component that is employed to selectively finalize layout on children elements.

7. The system of claim 1, the visible items are associated with subcomponents or children elements appearing within the visible items.

8. The system of claim 1, the rough layout component performs a conceptual pass on the visible items when a user interface object is constructed and added to a container.

9. The system of claim 8, the rough layout component is controlled by an implementor of a class.

10. The system of claim 8, the rough layout component determines property bounds of an object.

11. The system of claim 8, the rough layout component sets a "Layout Valid"property to false to inform a system that a layout is to be completed before an object is displayed.

12. The system of claim 1, drawing component is a virtual function having the signature Draw(Graphics g, ShapeF updateRegion).

13. The system of claim 12, further comprising a supplied region that indicates an area to be filled in.

14. The system of claim 13, further comprising a window that is partially revealed where the region is smaller than a total area of the window, the region employed for display optimization.

15. The system of claim 1, further comprising at least one application, the application including at least one of a user interface component, a CAD system, a software development system, a modeling system, a drawing system, and a diagrammatic system.

16. A system for rendering items to a display, comprising:
    at least one memory; and
    at least one processor coupled to the at least one memory, the at least one processor configured to act as:
    means for processing a set of display items;
    means for determining a complexity value for the display items; and
    means for associating a flag with the display items, the flag being true for complex items and the flag being false for non-complex items;
    means for rendering the display items based in part on the complexity value and the flag; and
    means for indicating that a layout for an object is to be completed before the object is displayed by configuring one or more properties of the object.

17. A method to facilitate selective updating of a display, comprising:
    utilizing a computing device comprising a processor and a memory to perform the selective updating, the selective updating comprising:
    determining a rough layout for a collection of information items;
    determining a complexity parameter for the information items;
    associating a flag with the information items, the flag being true for complex items and the flag being false for non-complex items;
    tagging non-complex items from the collection for immediate display;
    selectively tagging remaining complex items from the collection for display at a later time; and identifying one or more child elements of the information items for which respective layouts are to be completed before display of the one or more child elements.

18. The method of claim 17, further comprising providing a Final Layout function, a Layout Complete function, and a Draw function to render items to a display.

19. The method of claim 17, the Rough Layout is invoked is for components and subcomponent to be displayed, an approximate representation of a size of individual the components and subcomponents is calculated.

20. The method of claim 17, further comprising a child element rendering process, the process including at least one of:
1) translating a region into local coordinates;
2) determining which child elements are potentially required to draw;
3) checking a layout validity of the child elements;
4) invoking Final Layout on any item for which LayoutValid=>false; and
5) invoking a draw function on child elements which overlap an update region.

21. A computing device comprising a memory and a processor coupled to the memory that executes machine-executable instructions for rendering a graphical user interface, the graphical user interface comprising:
at least one display object for displaying contents of an information item; and
at least one layout function that selectively renders the display object based upon a determined graphical complexity associated with the information item, the layout function comprises creating a rough layout for the display object, identifying at least one child element of the display object for which a final layout is to be completed before display thereof, determining complexity of the information item, and creating a final layout for at least one visible portion of the display object if the information item is determined to be a complex information item.

* * * * *